US010809733B2

(12) United States Patent
Lindemann et al.

(10) Patent No.: US 10,809,733 B2
(45) Date of Patent: Oct. 20, 2020

(54) INTELLIGENT MOTOR VEHICLES, SYSTEMS, AND CONTROL LOGIC FOR DRIVER BEHAVIOR COACHING AND ON-DEMAND MOBILE CHARGING

(71) Applicant: GM Global Technology Operations LLC, Detroit, MI (US)

(72) Inventors: Todd P. Lindemann, Howell, MI (US); Bryce J. Benfield, Milford, MI (US); John M. Clarahan, Farmington Hills, MI (US); Robert Stacey, Flushing, MI (US); Freddy V. Rayes, Shelby Township, MI (US); Kunaal Verma, Royal Oak, MI (US); Allan K. Lewis, Windsor (CA); Apral S. Hara, Lasalle (CA)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 16/161,350

(22) Filed: Oct. 16, 2018

(65) Prior Publication Data

US 2020/0117204 A1   Apr. 16, 2020

(51) Int. Cl.
*G05D 1/02* (2020.01)
*G05D 1/00* (2006.01)
(Continued)

(52) U.S. Cl.
CPC ............ *G05D 1/0217* (2013.01); *B60L 53/00* (2019.02); *G01C 21/3469* (2013.01);
(Continued)

(58) Field of Classification Search
CPC .............. G05D 1/0217; G05D 1/0088; G05D 2201/0213; B60L 53/00; G01C 21/3469; G07C 5/004
(Continued)

(56) References Cited

U.S. PATENT DOCUMENTS 4,860,861 A   8/1989   Gooch et al.
5,947,243 A   9/1999   MacDonald
(Continued)

FOREIGN PATENT DOCUMENTS

EP   0200335 A2   11/1986
EP   2477151 A2 * 7/2012   ............. G06Q 30/06
(Continued)

*Primary Examiner* — Tuan C To
(74) *Attorney, Agent, or Firm* — Quinn IP Law (57) ABSTRACT

Presented are intelligent vehicle systems and control logic for driver coaching and on-demand vehicle charging, methods for making/using such systems, and motor vehicles with real-time eco-routing and automated driving capabilities. A method for controlling operation of a vehicle includes: determining an origin and destination for the vehicle; conducting a geospatial query to identify a candidate route for traversing from the origin to the destination; determining, based on current electrical characteristics of the vehicle's battery pack, an estimated driving range for the vehicle; responsive to the estimated driving range being less than the candidate route's distance, evaluating energy characteristics of the candidate route to derive an estimated energy expenditure to reach the destination; using the estimated energy expenditure, generating an action plan with vehicle maneuvering and/or accessory usage actions that extend the estimated driving range; and commanding a resident vehicle subsystem to execute a control operation based on the action plan.

20 Claims, 5 Drawing Sheets

(51) Int. Cl.
*G07C 5/00* (2006.01)
*G01C 21/34* (2006.01)
*B60L 53/00* (2019.01)

(52) U.S. Cl.
CPC .......... *G05D 1/0088* (2013.01); *G07C 5/004* (2013.01); *G05D 2201/0213* (2013.01)

(58) Field of Classification Search
USPC ........................................................ 701/22
See application file for complete search history.

(56) References Cited

U.S. PATENT DOCUMENTS

| | | | |
|---|---|---|---|
| 6,405,106 B1 | 6/2002 | Sheth et al. | |
| 7,198,587 B2 | 4/2007 | Samie et al. | |
| 7,360,615 B2 | 4/2008 | Salman et al. | |
| 7,539,562 B2 | 5/2009 | Maguire et al. | |
| 7,653,469 B2 | 1/2010 | Bai et al. | |
| 7,681,675 B2 | 3/2010 | Samie et al. | |
| 7,810,476 B2 | 10/2010 | Wang et al. | |
| 7,862,437 B2 | 1/2011 | Clark et al. | |
| 7,878,935 B2 | 2/2011 | Lahr | |
| 7,931,561 B2 | 4/2011 | Otanez et al. | |
| 7,980,992 B2 | 7/2011 | Sturgin | |
| 8,011,464 B2 | 9/2011 | Samie et al. | |
| 8,036,785 B2 | 10/2011 | Maguire et al. | |
| 8,042,670 B2 | 10/2011 | Bartos et al. | |
| 8,073,605 B2 | 12/2011 | Naik et al. | |
| 8,091,416 B2 | 1/2012 | Wang et al. | |
| 8,095,290 B2 | 1/2012 | Smyth et al. | |
| 8,099,220 B2 | 1/2012 | Kim et al. | |
| 8,201,444 B2 | 6/2012 | Wang et al. | |
| 8,214,122 B2 | 7/2012 | Krupadanam et al. | |
| 8,239,076 B2 | 8/2012 | McGarry et al. | |
| 8,260,481 B2 | 9/2012 | Naik et al. | |
| 8,276,373 B2 | 10/2012 | Wang et al. | |
| 8,290,637 B2 | 10/2012 | Krupadanam et al. | |
| 8,374,740 B2 | 2/2013 | Druenert et al. | |
| 8,392,091 B2 | 3/2013 | Hebbale et al. | |
| 8,392,112 B2 | 3/2013 | Bradburn et al. | |
| 8,425,364 B2 | 4/2013 | Lahr | |
| 8,499,912 B2 | 8/2013 | Samie et al. | |
| 8,504,258 B2 | 8/2013 | Tiberg | |
| 8,606,483 B2 | 12/2013 | Krupadanam et al. | |
| 8,612,119 B2 | 12/2013 | Wang et al. | |
| 8,694,197 B2 | 4/2014 | Rajagopalan et al. | |
| 9,133,750 B2 | 9/2015 | Levijoki et al. | |
| 2005/0126878 A1 | 6/2005 | Samie | |
| 2006/0064232 A1 | 3/2006 | Ampunan et al. | |
| 2008/0051973 A1 | 2/2008 | Gangopadhyay et al. | |
| 2008/0265835 A1 | 10/2008 | Reed et al. | |
| 2010/0198754 A1 | 8/2010 | Jones et al. | |
| 2012/0085082 A1 | 4/2012 | Levijoki et al. | |
| 2012/0181953 A1 | 7/2012 | Hsu et al. | |
| 2012/0286063 A1 | 11/2012 | Wang et al. | |
| 2013/0027048 A1 | 1/2013 | Schwarz et al. | |
| 2013/0038279 A1 | 2/2013 | Seyerle et al. | |
| 2014/0197776 A1 | 7/2014 | Schlaupitz et al. | |
| 2014/0254050 A1 * | 9/2014 | Haines | H02H 3/162 361/42 |
| 2016/0052450 A1 | 2/2016 | Chan et al. | |
| 2016/0114692 A1 * | 4/2016 | Tripathi | B60L 58/13 320/109 |
| 2016/0114698 A1 * | 4/2016 | Chow | B60L 11/1861 701/22 |
| 2016/0245662 A1 | 8/2016 | Rajagopalan et al. | |
| 2016/0285296 A1 | 9/2016 | Namou et al. | |
| 2016/0333747 A1 * | 11/2016 | KanFman | F04B 41/06 |
| 2016/0356616 A1 * | 12/2016 | Woon | B60W 50/0097 |
| 2017/0113546 A1 * | 4/2017 | Maeda | B60K 23/04 |
| 2017/0129495 A1 * | 5/2017 | Eguchi | B60W 10/08 |
| 2017/0176199 A1 * | 6/2017 | Jones | G07C 5/02 |
| 2017/0276902 A1 * | 9/2017 | Umezawa | G02B 7/09 |
| 2017/0299401 A1 * | 10/2017 | Choi | G01C 21/3682 |
| 2018/0058868 A1 | 3/2018 | Kang et al. | |

FOREIGN PATENT DOCUMENTS

| | | | | |
|---|---|---|---|---|
| EP | 2822325 A1 * | 1/2015 | ......... | G01C 21/3446 |
| WO | WO-2013057077 A2 * | 4/2013 | ......... | G06T 15/205 |
| WO | WO-2013135488 A2 * | 9/2013 | ......... | G01C 21/20 |

* cited by examiner

INTELLIGENT MOTOR VEHICLES, SYSTEMS, AND CONTROL LOGIC FOR DRIVER BEHAVIOR COACHING AND ON-DEMAND MOBILE CHARGING

INTRODUCTION

The present disclosure relates generally to vehicle energy use estimation and route planning. More specifically, aspects of this disclosure relate to intelligent motor vehicles with control logic for predictive eco-route planning and adaptive driving control.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power to the vehicle's road wheels through a manually or automatically shifted multi-speed transmission and a final drive system (e.g., differential, axle shafts, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources to propel the vehicle and, thus, minimize or eliminate reliance on a fossil-fuel based engine for tractive power.

Hybrid vehicle powertrains utilize multiple sources of tractive power to propel the vehicle, most commonly operating an internal combustion engine assembly in conjunction with a battery-powered or fuel-cell-powered electric motor. A hybrid electric vehicle (HEV), for example, stores both electrical energy and chemical energy, and converts the same into mechanical power to drive the vehicle's road wheels. The HEV is generally equipped with an electric machine (E-machine), often in the form of a motor/generator unit (MGU), that operates in parallel or in series with an ICE. Series hybrid architectures derive all tractive power from electric motor(s) and, thus, eliminate any driving mechanical connection between the engine and final drive members. By comparison, the engine and motor/generator assemblies of parallel hybrid architectures each have a driving mechanical coupling to the power transmission. Since hybrid vehicles are designed to derive their power from sources other than the ICE, engines in HEVs may be turned off, in whole or in part, while the vehicle is propelled by the electric motor(s).

A full electric vehicle (FEV)—colloquially known as an "electric car"—is an alternative type of electric-drive vehicle configuration that altogether eliminates the internal combustion engine and attendant peripheral components from the powertrain system, relying solely on electric traction motors for vehicle propulsion. Battery electric vehicles (BEV), for example, utilize energy stored within a rechargeable, onboard battery pack, rather than a fuel tank, fuel cell, or fly-wheel, to power the electric motor(s). The electric vehicle employs an electrical power distribution system governed via a powertrain control module (PCM) for transmitting electrical energy back-and-forth between the onboard battery pack and the electric motor(s). Plug-in electric vehicle (PEV) variants allow the battery pack to be recharged from an external source of electricity, such as a public power grid, via a residential or commercial vehicle charging station.

As vehicle processing, communication, and sensing capabilities continue to improve, manufacturers persist in offering more system-automated driving capabilities with the aspiration of eventually commercializing fully autonomous vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars, integrating wireless connectivity (e.g., Dedicated Short Range Communications) with higher-level driving automation that employs autonomous steering, braking, and powertrain systems to enable driverless vehicle operation. Automated route generation systems utilize vehicle state and dynamics sensors, roadway map data, and path prediction algorithms to provide vehicle routing and rerouting with automated lane center and lane change forecasting, scenario planning, etc. For purposes of this disclosure, the terms "automated" and "autonomous" vehicles may be used synonymously and interchangeably to denote vehicles with partially assisted and/or fully autonomous driving capabilities, including any relevant vehicle platform that may be classified as a Society of Automotive Engineers (SAE) Level 2, 3, 4 or 5 vehicle.

Many automobiles are now equipped with an onboard vehicle navigation system that utilizes a global positioning system (GPS) transceiver in cooperation with navigation software and a mapping database to obtain roadway topography, traffic, and speed limit information associated with the vehicle's current location. Advanced driver assistance systems (ADAS) and autonomous driving systems are often able to adapt certain automated driving maneuvers based on roadway information obtained by the in-vehicle navigation system. Ad-hoc-network-based ADAS, for example, employ GPS and mapping data in conjunction with multi-hop geocast V2V and V2I data exchanges to facilitate automated vehicle maneuvering and powertrain control. During assisted and unassisted vehicle operation, the resident navigation system may determine a recommended travel route based on an estimated shortest time or estimated shortest distance between a route origin and a route destination for a given trip. This recommended travel route may then be displayed as a map trace or as turn-by-turn driving directions on a geocoded and annotated map. Such conventional approaches to route planning, while effective at determining the shortest travel distance/time to a desired destination, do not account for the most energy efficient routes or the most favorable routes for governing vehicle operation.

SUMMARY

Disclosed herein are intelligent vehicle systems with attendant control logic for driver behavior coaching and on-demand mobile vehicle charging, methods for making and methods for using such systems, and motor vehicles with real-time eco-routing and adaptive driving control capabilities. By way of example, there are presented novel driver behavior suggestion and coaching algorithms to help maximize electric-drive vehicle range. A representative control algorithm derives a definitive action plan that is presented to a driver to remediate scenarios where it is established, e.g., based on EV range prediction techniques, that the in-vehicle power storage system has insufficient energy for the vehicle to reach a desired destination or a charging station. Using real-time and forward-looking data, such as roadway map, terrain, weather, speed limit, etc., the vehicle coaches the driver with energy-use optimized instructions for vehicle operation and accessory usage to help ensure the vehicle safely achieves a user-selected destination in low range/state of charge (SOC) situations. The control logic may actively update and adjust the derived action plan to extend EV range, and initiate on-demand mobile charge delivery under predetermined circumstances. While discussed above with reference to FEV applications, disclosed control methodologies may be adapted to hybrid and ICE powertrain applications.

Disclosed eco-routing and coaching techniques help to extend eDriving range (e.g., for HEV and FEV applications) and/or increase overall vehicle fuel economy (e.g., for hybrid and ICE applications) while improving ADAS and autonomous driving functionality. Controller-generated driver action plans help to target vehicle functions that are measurably affected by vehicle occupants, such as drive power, vehicle speed, acceleration/deceleration, and cornering, HVAC and infotainment usage, etc. An action plan provides drivers with instructions to optimize corresponding power targets for these vehicle functions while concomitantly maintaining an energy buffer to reach an intended destination. User location and time-series charging data may be used to create a user activity baseline, including a snapshot of a driver's day-to-day commute and activity schedule; baseline data may be used to detect deviations in daily behavior in order to identify out-of-reach destination scenarios before they occur. On-demand charge delivery, e.g., via vehicle-to-vehicle or roadside assistance charging, may be employed to conveniently and quickly return a host vehicle to a baseline driving range. Other attendant benefits include the ability to create and optimize alternative routes that maximize power usage and increase accessibility to charge locations. Additionally, on-demand charge assets may be allocated and scheduled to intercept a vehicle or may be deployed upon request by a user for an on-demand charge.

Aspects of this disclosure are directed to real-time eco-routing techniques and adaptive driving control algorithms for optimizing vehicle energy usage. For instance, a method is presented for controlling operation of a motor vehicle to extend driving range. The vehicle includes multiple road wheels, a prime mover (e.g., ICE and/or MGU) that is operable to drive one or more of the road wheels, an energy storage device (e.g., battery pack and/or fuel tank) operable to power the prime mover, and a resident or remote vehicle controller that controls the prime mover. This representative method includes, in any order and in any combination with any of the above and below disclosed options and features: determining, e.g., via the vehicle controller through cooperative operation with a graphical human-machine interface (HMI) and a GPS transceiver, cellular data chip, etc., an origin and destination for the motor vehicle; conducting, e.g., via the vehicle controller through a resident or remote memory-stored map database, a geospatial query to identify a candidate route with a corresponding route distance for traversing from the vehicle's origin to the selected destination; determining, e.g., via the vehicle controller based on a current state of the energy storage device (e.g., the battery pack's current SOC), an estimated driving range for the motor vehicle; responsive to the estimated driving range being less than the candidate route's distance, evaluating various energy characteristics of the candidate route to determine an estimated energy expenditure to reach the vehicle destination; generating, e.g., via the vehicle controller based on this estimated energy expenditure, an action plan with one or more vehicle maneuvering actions and/or one or more accessory usage actions that collectively extend the vehicle's estimated driving range; and transmitting, e.g., via the vehicle controller, one or more command signals to one or more vehicle subsystems to execute one or more control operations based on the derived action plan.

Other aspects of the disclosure are directed to intelligent motor vehicles with real-time eco-routing and adaptive driving control capabilities. As used herein, the term "motor vehicle" may include any relevant vehicle platform, such as passenger vehicles (ICE, REV, FEV, etc.), commercial vehicles, industrial vehicles, tracked vehicles, off-road and all-terrain vehicles (ATV), motorcycles, farm equipment, etc. In an example, a motor vehicle includes a vehicle body with multiple road wheels operatively attached to the vehicle body. An electric traction motor mounted onto the vehicle body drives one or more of the road wheels to thereby propel the vehicle. Resident to the vehicle is a rechargeable traction battery pack that is electrically connected to and operable to power the traction motor. The motor vehicle is also equipped with a resident vehicle navigation system that is attached to the vehicle body, e.g., mounted inside the passenger compartment. The vehicle navigation system includes a vehicle location tracking device, a resident memory device, one or more electronic user input devices, and an electronic display device.

Continuing with the discussion of the above example, a resident vehicle controller is attached to the body of the motor vehicle and communicatively connected to the traction motor, battery pack, navigation system, etc. This vehicle controller is programmed to execute memory-stored instructions to determine an origin and destination for the motor vehicle, and contemporaneously conduct a geospatial query with a memory-stored map database to identify a candidate route for traversing the vehicle from the origin to the destination. The vehicle controller then calculates an estimated driving range for the motor vehicle based on a current state of charge of the rechargeable traction battery pack. If this estimated driving range is less than the total distance of the candidate route, the controller responsively evaluates energy characteristics of the candidate route to determine an estimated energy expenditure to reach the vehicle destination using this route. Based on this estimated energy expenditure, the resident vehicle controller generates an action plan with vehicle maneuvering and/or accessory usage actions designed to increase the estimated driving range. Once generated, the controller transmits a command signal to a resident vehicle subsystem to execute a control operation based on the action plan.

For any of the disclosed systems, methods, and vehicles, a resident/remote vehicle controller may be programmed to: respond to the estimated driving range being less than the total distance of a candidate route by conducting another geospatial query to identify an alternative candidate route for reaching the vehicle destination; and, responsive to the estimated driving range being equal to or greater than the total distance of the alternative candidate route, outputting an instruction (e.g., to an autonomous driving control module or as a prompt to the driver) to traverse from the vehicle origin to the vehicle destination using this candidate route. If the estimated driving range is less than the alternative candidate route's distance, the vehicle controller may responsively: evaluate energy characteristics of the alternative candidate route to determine a corresponding estimated energy expenditure to reach the desired destination; generate, based on this estimated energy expenditure, an alternative action plan with corresponding vehicle maneuvering and/or accessory usage actions determined to extend the estimated driving range; and transmit one or more command signals to one or more resident vehicle subsystems to execute one or more control operations based on the alternative action plan.

For any of the disclosed systems, methods, and vehicles, a resident/remote vehicle controller may be programmed to determine, prior to generating any action plan, which estimated energy expenditure is lowest. Upon determining the estimated energy expenditure for the first candidate route is lower than the estimated energy expenditure for the second candidate route, the first action plan is created. Conversely, if the estimated energy expenditure for the second candidate route is lowest, the second action plan is responsively generated. The vehicle controller may also: evaluate an opportunity cost for executing each vehicle maneuvering action and an opportunity cost for executing each accessory usage action; responsive to a vehicle maneuvering opportunity cost exceeding a calibrated threshold, determining an alternative vehicle maneuvering action for the action plan; and, responsive to an accessory usage opportunity cost exceeding a calibrated threshold, determining an alternative accessory usage action for the action plan.

For any of the disclosed systems, methods, and vehicles, a resident/remote vehicle controller may be programmed to determine drive profile details specific to a designated candidate route, and modify the action plan based on one or more of the drive profile details in order to minimize one or more vehicle driver/occupant limitations while maximizing a percentage for successfully arriving destination. The vehicle controller may also: monitor real-time driver performance relative to the action plan while the driver is operating the vehicle on the candidate route; determine if the driver's performance falls below a minimum performance threshold; and, if it does, responsively determine a revised action plan using an energy expenditure calculation to reach the vehicle destination on the candidate route based on the driver performance.

For any of the disclosed systems, methods, and vehicles, a resident/remote vehicle controller may be programmed to determine an estimated time increase to reach the vehicle destination on the candidate route using the action plan, and also determine an estimated time increase to coordinate and execute a charging of the traction battery pack using a mobile charging vehicle. If the time increase associated with executing a suggested action plan is greater than the time increase associated with executing an on-demand mobile charging (by at least a preset value (e.g., 20% or fifteen minutes)), the controller transmits a deploy request to the mobile charging vehicle. In this regard, if it is determined that the extended driving range using the action plan is still less than the candidate route's distance, the system may automatically transmit a deploy request to a mobile charging vehicle to execute a charging operation of the host vehicle's traction battery pack.

For any of the disclosed systems, methods, and vehicles, a resident/remote vehicle controller may be programmed to identify one or more vehicle charging sources (e.g., electric vehicle charging station (EVCS)) within a predetermined proximity of the vehicle's current location and/or candidate route, and identify one or more mobile charging vehicles (e.g., dedicated roadside assistance vehicle or volunteer crowd-sourced vehicle) available to recharge the traction battery pack. The controller then calculates a respective reduced cost function for each of the vehicle charging sources and mobile charging vehicles based on corresponding time, distance and cost data. The system then selects either a vehicle charging source or a mobile charging vehicle based on which option has the lowest reduced cost function. As another option, after identifying one or more proximal vehicle charging sources and one or more available mobile charging vehicles, the controller may display, via an electronic display device of a vehicle navigation system, an option to select from the available vehicle charging sources and mobile charging vehicles. The vehicle controller thereafter receives, via an electronic input device, a user selection of either a vehicle charging source or a mobile charging vehicle.

For any of the disclosed systems, methods, and vehicles, the resident vehicle subsystem may be in the form of an Advanced Driver Assistance System (ADAS); in this instance, the controller-commanded control operation may include the ADAS implementing a set of enhanced low-energy-consumption driving rules when governing a steering, braking, or other driving maneuver. In the same vein, the resident vehicle subsystem may be in the form of an autonomous driving control module (ADCM); in this instance, the controller-commanded control operation may include the ADCM modulating automated driving of the motor vehicle based on a set of enhanced low-energy-consumption driving rules. As yet another option, the resident vehicle subsystem may be in the form of a vehicle navigation system; in this instance, the control operation includes saving estimated energy expenditures and action plans to reach a vehicle destination using candidate routes; and displaying each action plan with instructions for executing the corresponding vehicle maneuvering and/or accessory usage actions.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Figure 1:
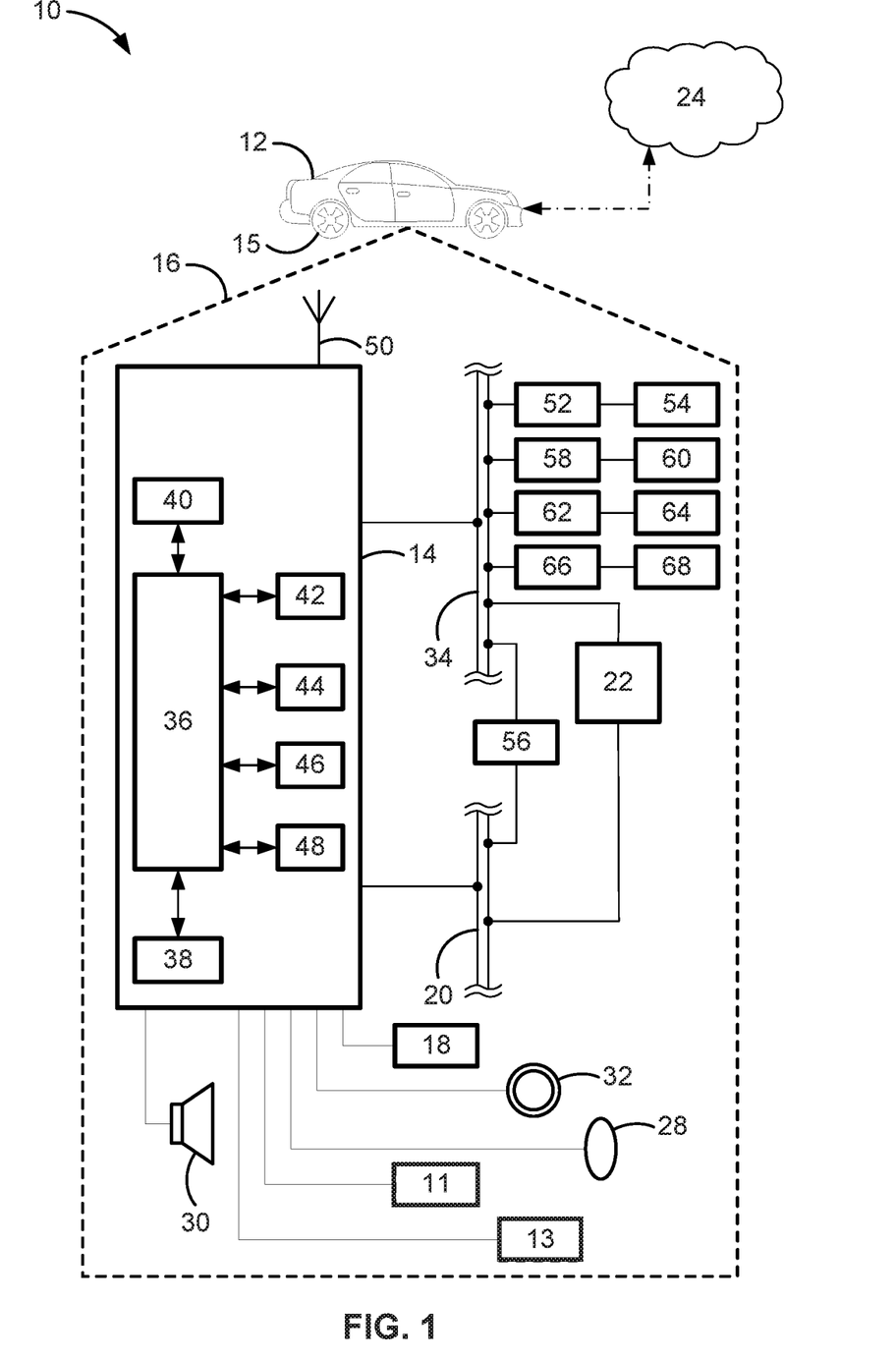
FIG. 1 is a schematic illustration of a representative motor vehicle with a network of in-vehicle controllers, sensing devices, and communication devices for executing eco-routing techniques, driver coaching, and automated driving operations to extend driving range in accordance with aspects of the present disclosure.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more assisted or automated driving operations. The illustrated automobile 10—also referred to herein as "motor vehicle" or "vehicle" for short—is merely an exemplary application with which aspects and features of this disclosure may be practiced. In the same vein, implementation of the present concepts for the specific computing network architecture portrayed in the drawings should also be appreciated as an exemplary application of the novel features disclosed herein. As such, it will be understood that aspects of this disclosure may be applied to other system architectures, utilized for various automated vehicle operations, and implemented for any logically relevant type of motor vehicle. Moreover, only select components of the network and vehicle have been shown and will be described in additional detail below. Nevertheless, the motor vehicles and network architectures discussed herein may include numerous additional and alternative features, and other available peripheral components, for example, to carry out the methods and functions of this disclosure. Lastly, the drawings presented herein are not to scale and are provided purely for instructional purposes. Thus, the specific and relative dimensions shown in the drawings are not to be construed as limiting.

The representative vehicle 10 of FIG. 1 is originally equipped with a vehicle telecommunication and information ("telematics") unit 14 that wirelessly communicates (e.g., via cell towers, base stations, V2X, and/or mobile switching centers (MSCs), etc.) with a remotely located or "off-board" cloud computing service system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, keyboards, trackpads, touchscreens, etc.). Generally, these hardware components 16 function, at least in part, as a resident vehicle navigation system, e.g., to enable assisted and/or automated vehicle navigation, and as a human/machine interface (HMI), e.g., to enable occupants to communicate with the telematics unit 14 and other systems and system components of the vehicle 10. Microphone 28 provides a vehicle occupant with means to input verbal or other auditory commands; the vehicle 10 may be equipped with an embedded voice-processing unit programmed with a computational speech recognition software module. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound via one or more speaker components.

Communicatively coupled to the telematics unit 14 is a network connection interface 34, suitable examples of which include a twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with assorted systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an ADAS electronic control unit (ECU) 52, an engine control module (ECM) 54, a powertrain control module (PCM) 56, sensor interface module(s) 58, a brake system control module (BSCM) 60, and assorted other vehicle ECUs, such as a transmission control module (TCM), a climate control module (CCM), an autonomous driving control module (ADCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), a dedicated control module, etc. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. CPU 36 regulates power exchanges between a traction motor 11 and a traction battery pack 13 in order to drive one or more of the vehicle's road wheels 15 and thereby propel the vehicle 10.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The assortment of communications devices described above may be configured to exchange data as part of a periodic broadcast in a V2V or V2I communication interface or other vehicle-to-everything (V2X) communication system, e.g., Vehicle-to-Network V2N (V2N), Vehicle-to-Pedestrian (V2P), Vehicle-to-Device (V2D), etc.

CPU 36, acting as a resident vehicle controller, may receive sensor data from one or more sensing devices that use, for example, photo detection, radar, laser, ultrasonic, optical, infrared, or other suitable technology for executing an automated driving operation. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. Digital camera 62 may use a charge coupled device (CCD) or other suitable optical sensor to generate images indicating a field-of-view of the vehicle 10, and may be configured for continuous image generation, e.g., at least about 35 images per second. By way of comparison, range sensor 64 may emit and detect reflected radio, electromagnetic, or light-based waves (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. Furthermore, the vehicle dynamics sensor 68 may be in the nature of a single-axis or a triple-axis accelerometer, an angular rate sensor, an inclinometer, inertial measurement unit (IMU), etc., for detecting longitudinal and lateral acceleration, yaw, roll, and/or pitch rates, or other dynamics related parameter. Using data from the sensing devices 62, 64, 66, 68, the CPU 36 identifies objects within a detectable range of the vehicle 10, and determines attributes of the target object, such as size, relative position, angle of approach, relative speed, etc.

Figure 2:
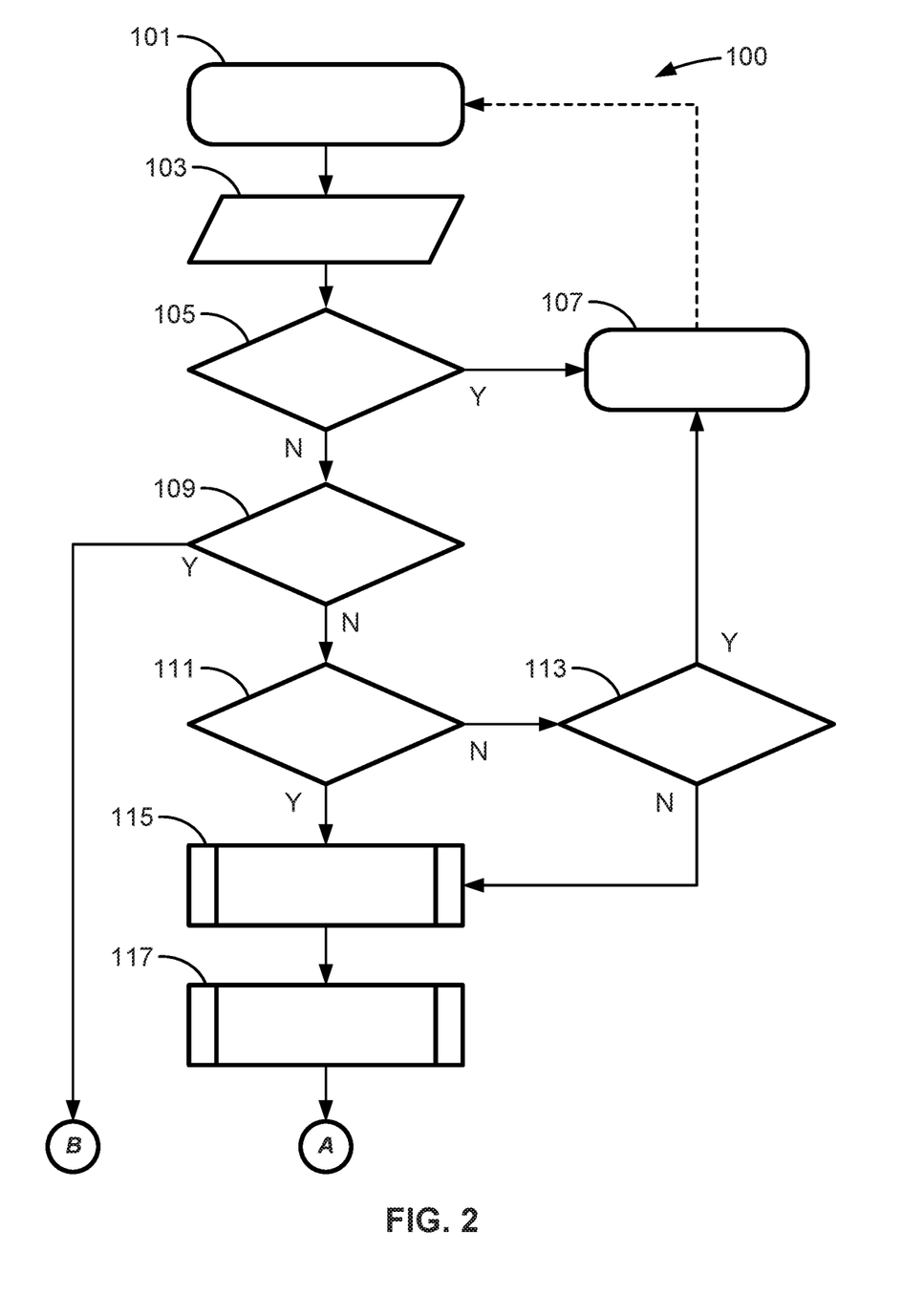
FIGS. 2-4 collectively illustrate a flowchart of a representative eco-routing control algorithm for provisioning intelligent driver coaching to extend vehicle range, which may correspond to memory-stored instructions executed by onboard or remote control-logic circuitry, programmable electronic control unit, or other computer-based device or network of devices in accord with aspects of the disclosed concepts.
Figure 3:
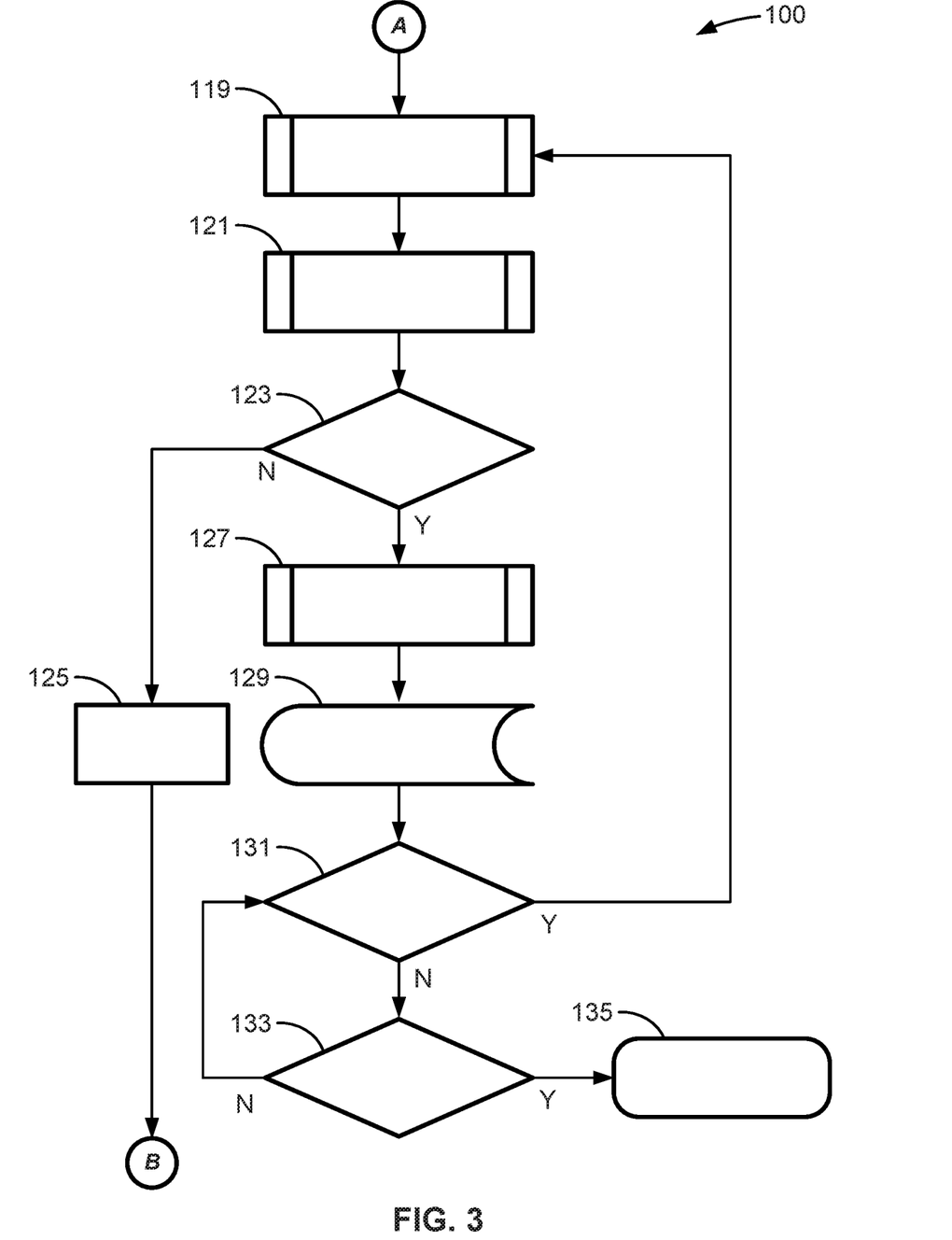
Figure 4:
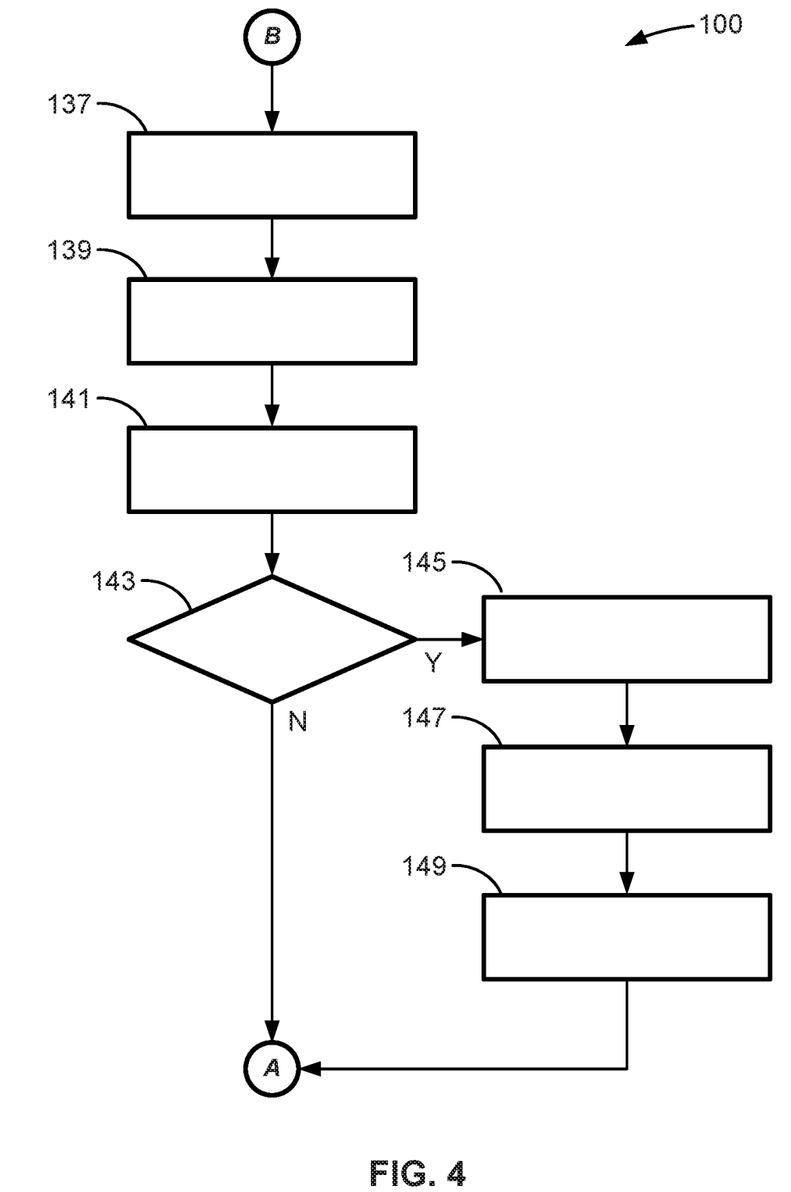

With reference now to the flowchart of FIGS. 2-4, an improved eco-routing method or control strategy for provisioning intelligent driver coaching and on-demand mobile vehicle charging to extend driving range of a motor vehicle, such as automobile 10 of FIG. 1, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 of FIG. 2 with processor-executable instructions for a programmable controller or control module or similarly suitable processor to call up an initialization procedure for a real-time eco-routing protocol that provides accurate fuel/battery consumption estimates, intelligent driver coaching, and on-demand traction battery pack recharging to extend driving range. This routine may be executed in real-time, continuously, systematically, sporadically and/or at regular intervals, for example, each 100 milliseconds, etc., during ongoing vehicle operation. As yet another option, terminal block 101 may initialize responsive to a command prompt from a user or a broadcast prompt signal from a backend or middleware computing node tasked with collecting, analyzing, sorting, storing and distributing vehicle data. As part of the initialization procedure at block 101, resident vehicle telematics unit 14 may execute a navigation processing code segment, e.g., to obtain geospatial data, vehicle dynamics data, timestamp and related temporal data, etc., and optionally display select aspects of this data to an occupant of the vehicle 10. A driver or other occupant of vehicle 10 may employ any of the HMI input controls 32 to select a desired origin and/or destination at process block 101. It is also envisioned that the CPU 36 or telematics unit processors 40 receive vehicle origin and destination information from other sources, such as a server-class computer provisioning data exchanges for the cloud computing system 24 or a dedicated mobile software application operating on a smartphone or other handheld computing device.

Once a vehicle origin (starting position) and vehicle destination (ending position) are confirmed at terminal block 101, the method 100 executes a geospatial query at input/output block 103 to identify candidate routes for traversing from the designated origin to the selected destination. By way of example, and not limitation, the query conducted at block 103 may utilize the vehicle's real-time location information (i.e., a set of GPS-generated geodetic datum) and temporal information (i.e., a timestamp produced by a real-time clock (RTC)) to identify one or more candidate routes with corresponding geospatial information for reaching a selected destination from a given origin. Geospatial information may include, in some non-limiting examples, roadway geometry and boundary data, road shoulder and center location data, gradient data, intersection midpoint location data, etc. Rather than identify a single route option, which may not necessarily provide an optimal travel route for a subject vehicle on a particular day, the geospatial query of input/output block 103 may identify multiple routes corresponding to the vehicle's start and end positions.

Method 100 may concomitantly access an OPENSTREET-MAP® (OSM) data service or similarly suitable mapping database to "lookup" road-level data associated with each route. This baseline "road-level" information may include the interconnecting segments that form a given route, a name for each road segment, a speed limit for each road segment, lane alignment information, traffic light locations, stop sign positions, highway entrance/exit information, etc.

After establishing a vehicle origin, destination, and candidate route(s), and then aggregating relevant road-level data and roadway traffic/disturbance data for each route, the method 100 proceeds to decision block 105 of FIG. 2 to ascertain whether or not the vehicle has a sufficient amount of stored energy to reach the desired destination, e.g., without controller-automated assistance or carrying out a charging operation. If multiple candidate routes are generated at input/output block 103, the CPU 36/processors 40 of vehicle 10 may default to initially selecting and evaluating a "fastest" route with a shortest total travel distance and/or a shortest estimated travel time. Route distance and travel time may be estimated using suitable map-matching algorithms that utilize road segment connectivity along with position, speed, traffic, and heading data while taking into account both link connectivity and turn restrictions at interconnecting roadway junctions. Recognizably, the vehicle 10 may default to using different criteria for selecting an initial candidate route and, concomitantly, may employ alternative means for establishing said criteria. As yet a further option, CPU 36/processors 40 may default to concurrently evaluating all candidate routes (or a select subset thereof) to evaluate whether or not the vehicle 10 has sufficient range to reach the selected destination by any candidate route.

Prior to, contemporaneous with, or after selecting an initial "fastest" route or a set of candidate routes for evaluation, the method 100 determines an estimated driving range for the motor vehicle. By way of example, and not limitation, a driving range may be predicted based on historical driving range data specific to a subject vehicle that correlates a series of battery state of charge levels and/or fuel levels with prior-measured driving distances of that vehicle during one or more previous driving cycles. Additionally, or alternatively, a driving range of a vehicle employing an electrical storage device may be forecast by determining a current charge level of the storage device (e.g., state of charge (SOC), open circuit voltage (OCV), watt-hours (Wh), amphourse (Ahr), etc.), accessing geographical and road map data for the selected candidate route, and calculating driving range as a function of charge level, candidate route road-level and geospatial data, and vehicle-specific powertrain operating characteristics. After determining the candidate route's distance and the vehicle's driving range, the decision bock 105 determines if the current estimated driving range is larger than the overall distance of the candidate route. If it is (block 105=YES), the method 100 proceeds to terminal block 107, provides the driver with an initially selected candidate route, and thereafter terminates. On the other hand, the method 100 may thereafter return to terminal block 101 and run in a continuous loop.

Upon determining that the current estimated driving range is not larger than the overall distance of the candidate route and, thus, there is an insufficient amount of stored energy to reach the desired destination (block 105=NO), the method 100 proceeds to decision block 109 to conduct a preliminary assessment of whether implementing a driver coaching protocol will: (A) significantly increase a total travel time to the desired destination; and (B) increase a total travel time to the desired destination significantly more than an amount of time to replenish the vehicle's traction battery pack and/or fuel tank. For instance, the CPU 36 may run a system emulation of vehicle operation from origin to destination over a selected candidate route both while using and without using a vehicle-calibrated default action plan. If the overall increase in total travel time is less than a preset value (e.g., 20% or fifteen (15) minutes), decision block 109 returns a negative determination (block 109=NO) and the method 100 proceeds to decision block 111. However, if the overall increase in total travel time to implement driver coaching is more than the aforesaid preset value, the method 100 may consider if this coaching time increase is significantly larger than a recharging time increase to coordinate and execute a recharging of the vehicle's traction battery pack, e.g., via a mobile charging vehicle. If not (block 107=NO), the method 100 proceeds to decision block 111. Upon determining that the time increase associated with executing a driver-coaching action plan is substantially greater than the time increase associated with executing on-demand charging, e.g., by at least a preset value of 20% or fifteen (15) minutes, method 100 may continue to the process blocks presented in FIG. 4 to determine whether or not to issue a deploy request to a mobile charging vehicle or to instruct the driver to proceed to a nearby charging/fuel station.

With continuing reference to FIG. 2, decision block 111 provides memory-stored, processor-executable instructions to evaluate if a preliminarily selected candidate route, such as the "fastest" route option discussed above, is also the "greenest" route option. Put another way, it is recognized that the "fastest" route option may not per se be the optimal candidate route under all vehicle operating conditions. Situations in which a driver wishes to reach a specific destination without having the necessary vehicle power reserves to make that destination may warrant reevaluating the available candidate routes to identify which option requires the least amount of energy—is the "greenest"—thus making it feasible to reach the destination with the existing stored power. According to the illustrated example, decision block 111 may determine whether an estimated energy expenditure associated with a first (fastest) candidate route is greater or less than an estimated energy expenditure of a second (alternative) candidate route. Total vehicle energy consumption for a candidate route—be it fuel or battery or both—may be based on respective traffic, speed, and geometry information for that route. Optional implementations may also account for driver-specific historical behavior and vehicle-specific operating characteristics. Once it is concluded that the candidate route under investigation requires the least total vehicle energy consumption and, thus, may be considered the "greenest" option (block 111=YES), the method proceeds to predefined process block 115.

Responsive to a determination that an alternative candidate route requires a lower or lowest estimated energy expenditure and, thus, the preliminarily selected candidate route is not the "greenest" option (block 111=NO), the method 100 continues to decision block 113 to ascertain whether or not the vehicle has a sufficient amount of stored energy to reach the desired destination using the alternative route, e.g., without controller-automated assistance or carrying out a charging operation. In contrast to the techniques implemented at decision block 105, which generally focus on comparing current estimated driving range to a candidate route's total distance, decision block 113 compares stored energy available for consumption with estimated total energy consumption to traverse a subject candidate route. If decision block 113 returns a positive determination (block 113=YES), method 100 proceeds to terminal block 107, provides the driver with the greenest candidate route, and thereafter terminates or loops back to terminal block 101. Conversely, if decision block 113 returns a negative determination (block 113=NO), method 100 proceeds to predefined process block 115 to further evaluate the route designated as "greenest."

Predefined process blocks 115, 117 and 119 implement a more comprehensive analysis of a selected set of route energy characteristics of the candidate route designated at block 111 to determine the total energy needed to make it to the destination using the designated candidate route without jeopardizing the vehicle or occupant comfort. For predefined process block 115, the method 100 identifies a set of energy characteristics that will be evaluated for a designated candidate route. Candidate route features that affect vehicle energy use—i.e., "route energy characteristics"—may include a distance of each road segment that makes up the total candidate route, a grade or angle of each road segment, a legal speed limit and/or an average legal speed limit for each segment, a measure of concentration of traffic lights, stop signs, and similar traffic control-related delays along each road segment, historical traffic patterns along each road segment (e.g., historical average speed reductions for a given time of day), and/or real-time driving conditions along each road segment (e.g., a current average speed along a road segment, weather conditions along the road segment, any collisions or traffic slowdowns along the road segment, and the like). Some of the foregoing characteristics may be obtained by the CPU 36 of FIG. 1 from resident memory, while certain other characteristics may be obtained from cloud computing service system 24 of FIG. 1 or another remote data source. While it is envisioned that candidate routes may be evaluated against only a subset of all available route energy characteristics (e.g., rush hour or nighttime characteristics will not be relevant to all evaluations), it is plausible that some evaluations may necessitate weighing all energy characteristics.

At predefined process block 117, the method 100 provides instructions for a resident or remote processing device to evaluate the route energy characteristics selected at block 115 to determine which corresponding vehicle tasks may or may not be varied, and to what extent they may be varied, as part of an eco-routing action plan. By way of clarification, reducing vehicle speed from a driver's historical average (e.g., 78.3 mpg highway) to a vehicle-calibrated "eco" speed (e.g., 55 mph) may be desirable to optimize energy usage; however, a speed reduction of this magnitude may not be ideal for all driving scenarios (e.g., operating the vehicle on a crowded highway with a minimum vehicle speed of 60 mph). In such cases, the method 100 may place a minimum operating speed of 60 mph for corresponding highway segments of the candidate route when deriving the action plan in order to ensure that occupant welfare is not jeopardized. Vehicle acceleration and deceleration maneuvering actions may be similarly modulated to minimize driver restrictions while maximizing energy use and ensuring vehicle protection. As another example, the method 100 may rank different types of accessory usage by occupants of the vehicle in a manner that maximizes occupant comfort while minimizing energy use. If the vehicle 10 of FIG. 1 is operated in Arizona on a hot July afternoon or in Michigan on a cold January night, for example, the method 100 may prioritize heating, ventilation and air conditioning (HVAC) usage to maintain a comfortable cabin temperature while contemporaneously eliminating all "non-essential" infotainment and stereo use.

Turning next to FIG. 3, method 100 of FIG. 2 advances from predefined process block 117 to predefined process block 119 of FIG. 3—as indicated by the circled "A" in each of FIG. 2 and FIG. 3—and performs a comprehensive route-based energy calculation. A route-based energy calculation utilizes the set of energy characteristics that is selected for the designated candidate route at process block 115 and subsequently evaluated at predefined process block 117 to derive a total vehicle energy expenditure to traverse the candidate route from origin to destination under real-time operating and environmental conditions. This calculation takes into account power costs needed to perform attendant vehicle maneuvers, including acceleration, deceleration, turns, lane changes, stops, etc., and the time needed to execute each maneuver. Predefined process block 119 may also account for power costs associated with environmental elements, such as wind speed, rain, snow, ambient temperature, etc., which may be collectively designated as "additive elements" that are calculated together. Occupant behavior-related costs associated with accessory usage, gross vehicle weight (GVW), driving behavior, etc., are also accounted for at this juncture of method 100.

Contemporaneous with the route-based energy calculation performed at block 119, predefined process block 121 of method 100 evaluates a respective opportunity cost function for each of one or more or all attendant operations associated with reaching a vehicle destination. For this particular operation, a grouped area of conditions associated with a particular vehicle maneuvering action or accessory usage action is analyzed to approximate a "reasonable" energy savings that may be realized by a given modification to that action, such as an increase/decrease or activation/deactivation or applied maximum/minimum. This may include, for example, evaluating: a speed opportunity cost function associated with a suggested speed-related vehicle maneuvering action; an HVAC opportunity cost function associated with a suggested HVAC-related accessory usage action; and an acceleration/deceleration opportunity cost function associated with a suggested accel./decal.-related vehicle maneuvering action. Through this evaluation, the method 100 identifies energy cost-down opportunities in each suggested action as part of a coordinated effort to minimize impact to driver comfort and time-in-trip while merging multiple opportunities together to produce an optimal action plan giving driver-impact costs based on conditions.

Decision block 123 of FIG. 3 provides memory-stored, processor executable instructions to ascertain whether or not a selected vehicle destination can be reached from a specific starting position by traversing a selected (greenest) candidate route using a proposed action plan. Upon determining that the destination cannot be reached under existing circumstances (block 123=NO), method 100 proceeds to process block 125 and outputs to an occupant of the vehicle 10 a warning, e.g., displayed via display device 18, transmitted via audio system 22, or provided in any suitable manner, that the vehicle 10 will likely be unable to reach the desired destination. In a similar manner, the CPU 36 and/or processors 40 may also provide to the occupant an option to: (1) refuel/recharge the vehicle 10 at a nearby fill/charge station, or (2) deploy an on-demand mobile vehicle that delivers traction battery pack recharging services. Method 100 thereafter continues to the process blocks presented in FIG. 4 to determine whether or not to issue a deploy request to a mobile charging vehicle or to provide the driver with instructions for reaching a nearby charging/fuel station.

After establishing that the destination can in fact be reached under existing operating conditions using a controller-derived action plan (block 123=YES), method 100 proceeds to determine "en route" drive profile details for the action plan, as indicated at predefined process block 127. Generally speaking, these drive profile details help to maximize the likelihood of successfully arriving at a desired destination while minimizing limitations on the driver and vehicle occupants during the trip. At any point along the selected candidate route, for example, the telematics unit 14, display device 18, and/or audio system 22 provide performance feedback to the vehicle's occupants regarding expected energy usage data on several user-controllable elements. Such information may include real-time power consumption for drive power, HVAC power, speed, and/or any other user-controlled driving maneuver or accessory use. Through this protocol, the method 100 may evaluate real-time energy use and provide continual or continuous feedback that allows the vehicle users to modify their behavior for power-use optimization. By way of non-limiting example, the action plan may provide a restrictive set of actions at the beginning of a candidate route in an attempt to ensure arrival at the destination. If the user exceeds these power-use targets, the system can adapt the action plan and incorporate further restrictions for the final duration of the trip. Conversely, if the user meets the preset power-use targets, the system may adapt the action plan to reduce restrictions for the final duration of the trip. Data storage block 129 saves the drive profile details and supporting data for monitoring vehicle operation and providing user feedback.

With continuing reference to FIG. 3, the method 100 advances to decision block 131 to determine if a recalculation of route-based energy is warranted as a result of the data generated from monitoring and evaluating user/driver performance, as described above with respect to predefined process block 127. For instance, while monitoring driver performance and occupant accessory use, a significant deviation from the "coached behavior suggestions" may become apparent; as a result, the system may responsively reevaluate the results of the route-based energy calculation carried out at block 119 for the remainder of the trip to ascertain if there is still a high likelihood of reaching the desired destination. If a recalculation is warranted (block 131=YES) due to a marked deviation from the provided action plan, the method 100 loops back to predefined process block 119 and continues back through the succeeding method operations. On the other hand, if there is no significant departure from the action plan and, thus, recalculation is likely not warranted (block 131=NO), the method 100 will move to decision block 133 to determine if/when the vehicle 10 has arrived at the ending position. For as long as the vehicle 10 has not yet arrived at the vehicle destination (block 133=NO), method 100 may run in a continuous loop between blocks 131 and 133 until the vehicle 10 does reach its final destination. At that time (block 133=YES), method 100 proceeds to terminal block 135 and temporarily terminates.

From decision block 109 of FIG. 2 or process block 125 of FIG. 3, method 100 advances through circled "B" of FIG. 2 or FIG. 3 and circled "B" of FIG. 4, to process block 137, and performs a geolocational query to identify one or more recharging/refueling sources, if any, within a predetermined proximity of the vehicle origin or the candidate route. This operation may merely involve accessing a list of available nearby charging sources stored in resident memory device(s) 38 of FIG. 1, and identifying a subset of these options that is within a user-selected or default-mandated proximity of the vehicle's origin or candidate route. As another option, the telematics unit 14 may broadcast a prompt to cloud computing service system 24, which includes the current geodetic datum of the vehicle 10 along with a request for data indicative of any/all recharging/refueling sources proximal the vehicle 10. After developing an inventory of available nearby recharging/refueling sources, the method 100 proceeds to process block 139 to estimate a respective total refuel/recharge time associated with each option. In an on-demand mobile vehicle recharging operation, for example, the method 100 may access location and dynamics information directly from the host vehicle and the refueling/recharging vehicle, and thereafter run a recursive estimate of the current and projected locations of both vehicles. From this information, the method 100 may then derive an optimized (fastest and most convenient) meeting location for the two vehicles.

With continuing reference to FIG. 4, method 100 moves to process block 141 to identify which of the proximal recharging/refueling sources is a "best match" for the host vehicle by reducing a cost function for each available charging service based on corresponding time data, distance data, cost data, etc. In general, the method 100 juxtaposes the various recharging/refueling sources to compare time, distance traveled, and monetary costs associated with the available options. These factors may be weighted based on crowd-sourced data, end-user input, vehicle testing, and other relevant factors, for example. For at least some implementations, selection of an optimal recharging/refueling source may be carried out by the CPU 36/processors 40 of vehicle 10. Alternatively, the various available options may be presented to the driver via electronic video display device 18; the driver may then select one of the available options through the assorted input controls 32 of FIG. 1.

Decision block 143 determines whether a vehicle occupant has either selected one of the available recharging/refueling sources (YES) or has chosen to not implement any of the recharging/refueling options (NO). If the driver or another occupant wishes to forego a recharging/refueling operation (e.g., they are not willing to pay for the service) as the driver/occupant desires to implement a controller-generated action plan (e.g., despite any attendant time increases), the method 100 may loop back to predefined process block 119 at the top of FIG. 3. Alternatively, for scenarios in which a vehicle occupant chooses to not implement any of the recharging/refueling options (block 143=NO), and there are no action plans that will enable the vehicle 10 to reach a selected destination, the method 100 may respond by temporarily terminating. However, if the driver/occupant wishes to initiate a recharging/refueling operation (block 143=YES), the method 100 may responsively proceed to process block 145 and generates additional waypoints for the candidate route to carry out the charging operation. As an example, after the vehicle's origins and destinations are determined, and a candidate route is identified, the route may need to be modified to accommodate an on-demand mobile charging event. At process block 147, a deploy request may be transmitted to a selected mobile charging vehicle to commence on-demand charging; alternatively, a modified route may be displayed to the user with a corresponding set of turn-by-turn directions to reach a selected refueling/recharging station. Method 100 then proceeds to process block 149 to confirm the vehicle 10 has been sufficiently recharged, such that the vehicle 10 may resume towards the final destination. At this juncture, method 100 may temporarily terminate or loop back to terminal block 101.

Figure 5:
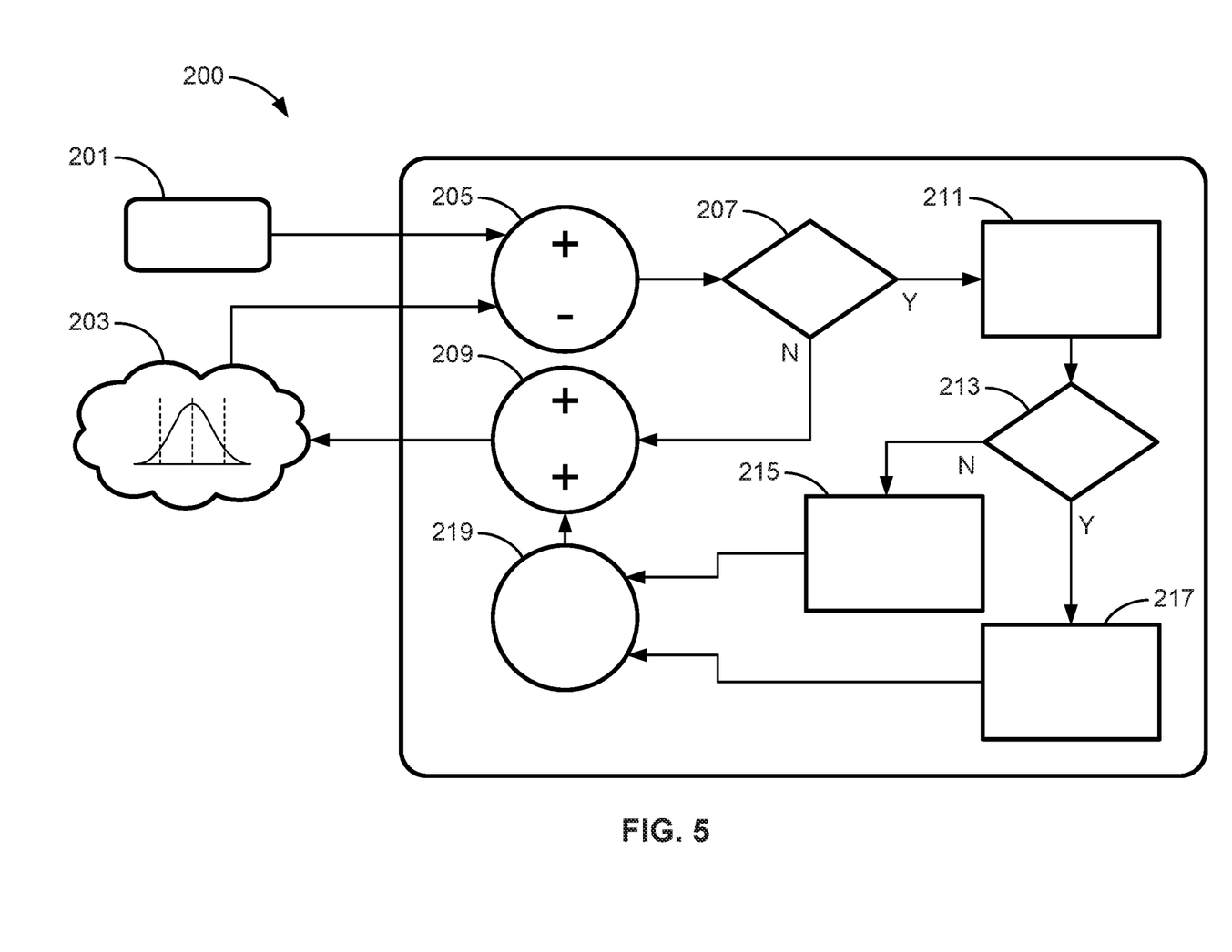
FIG. 5 is a flowchart illustrating a representative predictive element control algorithm for vehicle destination determination, which may correspond to memory-stored instructions executed by onboard or remote control-logic circuitry, programmable electronic control unit, or other computer-based device or network of devices in accord with aspects of the disclosed concepts.

FIG. 5 illustrates a representative predictive element control algorithm, designated generally at 200, for vehicle destination determination, e.g., without end-user input. Over the course of a preset behavior learning period (e.g., approximately four to six (4-6) weeks), the CPU 36 and/or processors 40 determine alert and on-demand service thresholds using aggregated user data, and thereafter calculate a deviation using current and historic location, charge behavior, and charge level data. If a deviation is detected, an alert may be generated and output to a user. A deviation may also be elevated, at which time an on-demand charge plan may be prepared. This on-demand charge may be deployed if requested by a driver or other occupant of the vehicle.

At operation 201 of FIG. 5, the method 200 evaluates a current traction battery pack SOC, temporal information, and GPS/location data of the vehicle, e.g., to build a normalized set of predictable driving patterns. Once the patterns have been recognized and stored, a comparison may be made to a current time, vehicle position, and battery pack SOC levels to determine a likely set of travel actions for SOC. In one example, upon identifying a deviation from a pattern with a low SOC, a change in destination will be recognized and, knowing there is a low SOC, a prompt may be made to warn the driver they may wish to consider mobile charging or consider altering their destination to ensure they have the needed SOC to make that destination. A second example might be an instance in which a driver is on a recognized route, yet a recognized destination for that recognized route is not within range of a current SOC; the driver may then be warned of an impending out of energy event.

With continuing reference to FIG. 5, operation 203 includes evaluating driver usage patterns, including a learned set of destinations frequented by a particular driver. This may include evaluating everyday driving to identify repeated events that happen within a week or a month, such as a driver travels approximately fifty (50) miles to a particular location for a meeting every first Thursday of the month. Storing information regarding where and how a driver might consistently drive is one aspect of knowledge for driver usage; inconsistent behavior may also be an important knowledge point. For example, a driver travels every Wednesday; however, the destination is different from week to week. This information can be used to warn a driver that recharging/refueling may be desired prior to a time when it is determined they may likely need to charge to ensure they reach their final destination.

At operation 205, the method 200 executes a comparison and calculation routine, along with pattern deviation recognition, SOC calculations of route patterns, along with any of the other examples described in the preceding paragraphs. For operation 207, the method 200 determines if a driver is deviating from a set of normalized driving patterns. If they are not (block 207=NO), method 100 continues to operation 209 to "learn" driver behavior and store learned driver behavior, vehicle energy usage, location data, and other pertinent information for comparison later. If the driver is deviating (block 207=YES), method 100 advances to operation 211 to generate and output an alert, which may be transmitted before or during a trip, and may include visual and audible warnings and/or suggestions.

Method 200 of FIG. 5 proceeds to decision block 213 if there is a convenient/accessible location within proximity of the vehicle for refueling/recharging. At this juncture, the system may be able to provide mobile charging solutions for drivers who are unable to reach a charge station and/or are unable to reach a next likely destination. Opportunities for mobile charging may range from scheduling an on-demand mobile charge vehicle to meet a host vehicle along a given route or scheduling a charge in a parking lot by a privately-owned individual. If there are not any convenient/accessible locations for carrying out a refueling/recharging operation (block 213=NO), the method 200 proceeds to operation 215 to carry out a proximity charge, e.g., where the host vehicle meets a mobile charging vehicle along the route. If there is a convenient/accessible location for carrying out a refueling/recharging operation (block 213=YES), a charge delivery for a parked vehicle at a set location is performed at block 217. At operation 219, an interface is accessed to call a mobile charging vehicle to a meeting location; payments are made and other related activities are carried out to complete the operation.

Aspects of this disclosure may be implemented, in some embodiments, through a computer-executable program of instructions, such as program modules, generally referred to as software applications or application programs executed by an onboard vehicle computer or a distributed network of resident and remote computing devices. Software may include, in non-limiting examples, routines, programs, objects, components, and data structures that perform particular tasks or implement particular data types. The software may form an interface to allow a resident vehicle controller or control module or other integrated circuit device to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network architectures, including multiprocessor systems, microprocessor-based or programmable-consumer electronics, minicomputers, mainframe computers, master-slave, peer-to-peer, or parallel-computation frameworks, and the like. In addition, aspects of the present disclosure may be practiced in distributed-computing environments where tasks are performed by resident and remote-processing devices that are linked through a communications network. In a distributed-computing environment, program modules may be located in both onboard and off-board computer-storage media including memory storage devices. Aspects of the present disclosure may therefore, be implemented in connection with various hardware, software or a combination thereof, in a computer system or other processing system.

Any of the methods described herein may include machine-readable instructions for execution by: (a) a processor, (b) a controller, and/or (c) any other processing device. Any algorithm, software, control logic, protocol, or method disclosed herein may be embodied in software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods for implementing the example machine readable instructions that may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle, the motor vehicle including a plurality of road wheels, a prime mover operable to drive at least one of the road wheels to thereby propel the motor vehicle, an energy storage device operable to power the prime mover, and a vehicle controller operable to control the prime mover, the method comprising:
    determining, via the vehicle controller, a vehicle origin and a vehicle destination for the motor vehicle;
    conducting, via the vehicle controller with a memory-stored map database, a geospatial query to identify a candidate route with a candidate route distance for the motor vehicle to traverse from the vehicle origin to the vehicle destination;
    determining, via the vehicle controller based on a current state of the energy storage device, an estimated driving range for the motor vehicle;
    evaluating, via the vehicle controller responsive to the estimated driving range being less than the candidate route distance, a plurality of energy characteristics of the candidate route to determine an estimated energy expenditure to reach the vehicle destination;
    generating, via the vehicle controller based on the estimated energy expenditure, an action plan with a vehicle maneuvering action and/or an accessory usage action determined to increase the estimated driving range to an extended driving range; and
    transmitting, via the vehicle controller, a command signal to a resident vehicle subsystem to execute a control operation based on the action plan.

2. The method of claim 1, further comprising:
    responsive to the estimated driving range being less than the candidate route distance, conducting a second geospatial query to identify a second candidate route with a second candidate route distance for traversing from the vehicle origin to the vehicle destination; and
    responsive to the estimated driving range not being less than the second candidate route distance, outputting an instruction to traverse from the vehicle origin to the vehicle destination using the second candidate route.

3. The method of claim 2, further comprising:
    responsive to the estimated driving range being less than the second candidate route distance, evaluating a plurality of energy characteristics of the second candidate route to determine a second estimated energy expenditure to reach the vehicle destination;
    generating, via the vehicle controller based on the second estimated energy expenditure, a second action plan with a second vehicle maneuvering action and/or a second accessory usage action determined to extend the estimated driving range; and
    transmitting, via the vehicle controller, a second command signal to a resident vehicle subsystem to execute a second control operation based on the second action plan.

4. The method of claim 3, further comprising:
    determining, prior to generating the action plan or the second action plan, whether the estimated energy expenditure is greater or less than the second estimated energy expenditure,
    wherein generating the action plan is responsive to the estimated energy expenditure being less than the second estimated energy expenditure, and
    wherein generating the second action plan is responsive to the estimated energy expenditure being greater than the second estimated energy expenditure.

5. The method of claim 1, further comprising:
    evaluating a maneuver opportunity cost and an accessory opportunity cost for executing the vehicle maneuvering action and the accessory usage action, respectively;
    responsive to the maneuver opportunity cost exceeding a first calibrated threshold, determining an alternative vehicle maneuvering action for the action plan; and
    responsive to the accessory opportunity cost exceeding a second calibrated threshold, determining an alternative accessory usage action for the action plan.

6. The method of claim 1, further comprising:
    determining a plurality of drive profile details specific to the candidate route; and
    modifying the vehicle maneuvering action and/or the accessory usage action based on one or more of the drive profile details to minimize a vehicle occupant limitation while maximizing a destination arrival success percentage.

7. The method of claim 1, further comprising:
    monitoring, via the vehicle controller in real-time, a driver performance relative to the action plan while driving the motor vehicle on the candidate route to the vehicle destination;
    determining if the driver performance is less than a minimum performance threshold; and
    responsive to the driver performance being less than the minimum performance threshold, determining a revised action plan using an energy expenditure calculation to reach the vehicle destination on the candidate route based on the driver performance.

8. The method of claim 1, wherein the prime mover includes a traction motor and the energy storage device includes a traction battery pack, the method further comprising:
    determining a coaching time increase to reach the vehicle destination on the candidate route using the action plan;
    determining a recharging time increase to coordinate and execute a charging of the traction battery pack via a mobile charging vehicle; and
    responsive to the recharging time increase being less than the coaching time increase by at least a preset value, transmitting a deploy request to the mobile charging vehicle.

9. The method of claim 1, wherein the prime mover includes a traction motor and the energy storage device includes a traction battery pack, the method further comprising:
    determining if the extended driving range is less than the candidate route distance; and
    responsive to the extended driving range being less than the candidate route distance, transmitting a deploy request to a mobile charging vehicle to execute a charging of the traction battery pack of the motor vehicle.

10. The method of claim 1, wherein the prime mover includes a traction motor and the energy storage device includes a traction battery pack, the method further comprising:
identifying a vehicle charging source within a predetermined proximity of the vehicle origin or the candidate route;
identifying a mobile charging vehicle available to execute a charging of the traction battery pack of the motor vehicle along the candidate route;
calculating, for the vehicle charging source and the mobile charging vehicle, respective reduced cost functions based on corresponding time, distance, and cost data; and
selecting, via the vehicle controller, one of the vehicle charging source or the mobile charging vehicle based on which of the respective reduced cost functions is the lowest.

11. The method of claim 1, further comprising:
identifying a vehicle charging source within a predetermined proximity of the vehicle origin or the candidate route;
identifying a mobile charging vehicle available to execute a charging of the electric storage device of the motor vehicle along the candidate route;
displaying, via an electronic display device of a vehicle navigation system, an option to select from the vehicle charging source and the mobile charging vehicle; and
receiving, via the vehicle controller from an input device, a signal indicative of a user selection of one of the vehicle charging source or the mobile charging vehicle.

12. The method of claim 1, wherein the resident vehicle subsystem includes an Advanced Driver Assistance System (ADAS) module operable to govern driving of the motor vehicle, and wherein the control operation includes the ADAS module implementing a set of enhanced low-energy-consumption driving rules.

13. The method of claim 1, wherein the resident vehicle subsystem includes an autonomous driving control module (ADCM) operable to automate driving of the motor vehicle, and wherein the control operation includes the ADCM modulating the automated driving of the motor vehicle based on a set of enhanced low-energy-consumption driving rules.

14. The method of claim 1, wherein the resident vehicle subsystem includes a vehicle navigation system and an electronic display device, and wherein the control operation includes: saving, in a memory device, the estimated energy expenditure to reach the vehicle destination using the candidate route; and displaying, via the electronic display device, the action plan with instructions for executing the vehicle maneuvering action and/or the accessory usage action.

15. A motor vehicle comprising:
a vehicle body;
a plurality of road wheels attached to the vehicle body;
a traction motor attached to the vehicle body and configured to drive at least one of the road wheels to thereby propel the motor vehicle;
a rechargeable traction battery pack electrically connected to and operable to power the traction motor;
a vehicle navigation system attached to the vehicle body and including an electronic display device and a resident memory device storing a map database; and
a resident vehicle controller attached to the vehicle body and programmed to:
determine a vehicle origin and a vehicle destination for the motor vehicle;
conduct a geospatial query with the memory-stored map database to identify a candidate route with a candidate route distance for the motor vehicle to traverse from the vehicle origin to the vehicle destination;
determine an estimated driving range for the motor vehicle based on a current state of charge of the rechargeable traction battery pack;
responsive to the estimated driving range being less than the candidate route distance, evaluate a plurality of energy characteristics of the candidate route to determine an estimated energy expenditure to reach the vehicle destination;
generate, based on the estimated energy expenditure, an action plan with a vehicle maneuvering action and/or an accessory usage action determined to increase the estimated driving range to an extended driving range; and
transmit a command signal to a resident vehicle subsystem to execute a control operation based on the action plan.

16. The motor vehicle of claim 15, wherein the resident vehicle controller is further programmed to:
responsive to the estimated driving range being less than the candidate route distance, conduct a second geospatial query to identify a second candidate route with a second candidate route distance for traversing from the vehicle origin to the vehicle destination; and
responsive to the estimated driving range not being less than the second candidate route distance, output an instruction to traverse from the vehicle origin to the vehicle destination using the second candidate route.

17. The motor vehicle of claim 16, wherein the resident vehicle controller is further programmed to:
responsive to the estimated driving range being less than the second candidate route distance, evaluate a plurality of energy characteristics of the second candidate route to determine a second estimated energy expenditure to reach the vehicle destination;
generate, based on the second estimated energy expenditure, a second action plan with a second vehicle maneuvering action and/or a second accessory usage action determined to extend the estimated driving range; and
transmit a second command signal to a resident vehicle subsystem to execute a second control operation based on the second action plan.

18. The motor vehicle of claim 17, wherein the resident vehicle controller is further programmed to:
determine, prior to generating the action plan or the second action plan, whether the estimated energy expenditure is greater or less than the second estimated energy expenditure,
wherein generating the action plan is responsive to the estimated energy expenditure being less than the second estimated energy expenditure, and
wherein generating the second action plan is responsive to the estimated energy expenditure being greater than the second estimated energy expenditure.

19. The motor vehicle of claim 15, wherein the resident vehicle controller is further programmed to:
evaluate a maneuver opportunity cost and an accessory opportunity cost for executing the vehicle maneuvering action and the accessory usage action, respectively; and responsive to the maneuver opportunity cost exceeding a first calibrated threshold, determine an alternative vehicle maneuvering action for the action plan; and responsive to the accessory opportunity cost exceeding a second calibrated threshold, determine an alternative accessory usage action for the action plan.

20. The motor vehicle of claim 15, wherein the resident vehicle controller is further programmed to:

determine a plurality of drive profile details specific to the candidate route; and modify the vehicle maneuvering action and/or the accessory usage action based on one or more of the drive profile details to minimize a vehicle occupant limitation while maximizing a destination arrival success percentage.

* * * * *